United States Patent
Kim et al.

(10) Patent No.: US 9,249,330 B2
(45) Date of Patent: *Feb. 2, 2016

(54) RESIN COMPOSITION AND ARTICLE USING THE SAME

(71) Applicant: Cheil Industries Inc., Gumi-si (KR)

(72) Inventors: Young-Sin Kim, Uiwang-si (KR); Kang-Yeol Park, Uiwang-si (KR); Young-Chul Kwon, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 19 days.

This patent is subject to a terminal disclaimer.

(21) Appl. No.: 13/872,260

(22) Filed: Apr. 29, 2013

(65) Prior Publication Data

US 2014/0066563 A1  Mar. 6, 2014

(30) Foreign Application Priority Data

Sep. 6, 2012  (KR) ........................ 10-2012-0099033

(51) Int. Cl.
| | | |
|---|---|---|
| C08K 9/08 | (2006.01) | |
| C09D 129/14 | (2006.01) | |
| C08L 33/12 | (2006.01) | |
| C08L 33/14 | (2006.01) | |
| C09D 183/00 | (2006.01) | |
| C09C 1/64 | (2006.01) | |
| C08K 9/02 | (2006.01) | |
| C08K 3/08 | (2006.01) | |

(52) U.S. Cl.
CPC .............. *C09D 129/14* (2013.01); *C08K 9/02* (2013.01); *C08K 9/08* (2013.01); *C08L 33/12* (2013.01); *C08L 33/14* (2013.01); *C09C 1/64* (2013.01); *C09C 1/644* (2013.01); *C09D 183/00* (2013.01); *C01P 2004/03* (2013.01); *C01P 2006/60* (2013.01); *C08K 2003/0812* (2013.01); *C08K 2201/005* (2013.01)

(58) Field of Classification Search
CPC .... C08K 3/08; C08K 9/08; C08K 2003/0812; C09C 1/64; C09C 1/644
USPC ................................................. 523/205, 206
See application file for complete search history.

(56) References Cited

U.S. PATENT DOCUMENTS

| | | | |
|---|---|---|---|
| 3,549,405 A * | 12/1970 | Schrenk et al. ................ 428/142 |
| 3,764,067 A * | 10/1973 | Coffey et al. ..................... 239/1 |
| 3,932,348 A | 1/1976 | Camelon et al. |
| 4,544,600 A | 10/1985 | Kern |
| 4,621,112 A * | 11/1986 | Backhouse et al. ........... 524/145 |
| 4,892,779 A | 1/1990 | Leatherman et al. |
| 5,010,112 A | 4/1991 | Glicksman et al. |
| 5,332,767 A | 7/1994 | Reisser et al. |
| 6,933,044 B2 | 8/2005 | Ishikawa |
| 7,553,887 B2 * | 6/2009 | Sugimoto et al. ............. 523/200 |
| 2002/0013398 A1 | 1/2002 | Ido et al. |
| 2006/0046057 A1 | 3/2006 | Huber et al. |
| 2006/0105663 A1 | 5/2006 | Greulich et al. |
| 2007/0276083 A1 | 11/2007 | Higashi et al. |
| 2008/0281029 A1 | 11/2008 | Morvan et al. |
| 2012/0065298 A1 | 3/2012 | Setoguchi |
| 2012/0129992 A1 | 5/2012 | Kang et al. |
| 2012/0264869 A1 | 10/2012 | Lee et al. |
| 2012/0270988 A1 | 10/2012 | Lee et al. |
| 2014/0072795 A1 * | 3/2014 | Kim et al. .................. 428/317.9 |

FOREIGN PATENT DOCUMENTS

| | | |
|---|---|---|
| CN | 1427910 A | 7/2003 |
| CN | 1764698 A | 4/2006 |
| CN | 101796110 A | 8/2010 |
| EP | 1306483 A1 | 5/2003 |
| EP | 1721939 A1 | 11/2006 |
| JP | 07-118561 A | 5/1995 |
| JP | 10-017674 A | 1/1998 |
| JP | 2001-262003 A | 9/2001 |
| JP | 2004-066500 A | 3/2004 |
| JP | 2004-346194 A1 | 12/2004 |
| JP | 2007-137963 A | 6/2007 |
| JP | 2009-046679 A | 3/2009 |
| JP | 2011-094056 | 5/2011 |
| JP | 2011-183577 | 9/2011 |
| KR | 10-2003-0035897 A | 5/2003 |
| KR | 10-2011-0008598 A | 1/2011 |
| KR | 10-2011-0057415 A | 6/2011 |
| KR | 10-2011-0079465 A | 7/2011 |
| KR | 10-2011-0107034 A | 9/2011 |
| KR | 10-2012-0027280 | 3/2012 |
| TW | 200621902 | 7/2006 |
| WO | 2006/041658 A1 | 4/2006 |
| WO | 2009/029095 A1 | 3/2009 |

* cited by examiner

*Primary Examiner* — Vickey Nerangis
(74) *Attorney, Agent, or Firm* — Additon, Higgins & Pendleton, P.A.

(57) ABSTRACT

A resin composition includes a thermoplastic resin and a metal-resin composite particle, wherein the metal-resin composite particle includes a metal deposition layer, a first coating layer positioned on one side of the metal deposition layer, and a second coating layer positioned on the other side of the metal deposition layer, and the first coating layer and second coating layer include a thermosetting resin respectively. An article includes the resin composition.

15 Claims, 4 Drawing Sheets

RESIN COMPOSITION AND ARTICLE USING THE SAME

CROSS-REFERENCE TO RELATED APPLICATION

This application claims priority to and the benefit of Korean Patent Application No. 10-2012-0099033 filed in the Korean Intellectual Property Office on Sep. 6, 2012, the entire disclosure of which is incorporated herein by reference.

FIELD

Resin composition and an article using the same are disclosed.

BACKGROUND

Recently, plastic exterior products of diverse colors have become increasingly popular for electronic parts, automobile parts and the like, and plastic exterior products with high a quality sense of touch.

The plastic exterior products usually include a plastic resin and a metal particle to give a metal-like texture to the resin appearance. This is disclosed in Japanese Patent Laid-Open Publication Nos. 2001-262003 and 2007-137963, but the metal-like texture did not appear in an actual experiment.

For example, Japanese Patent Laid-Open Publication No. 2001-262003 discloses the use of a flake-shaped metal particulate, but a weld line occurs in an actual experiment. Japanese Patent Laid-Open Publication No. 2007-137963 discloses a resin composition including a glass fiber and a metal particle, but appearance failure occurs due to the glass fiber in an actual experiment.

Accordingly, conventional articles formed by adding a metal particle and the like to a plastic resin may not exhibit a metal-like texture or may have various defects and thus are not suitable replacements for a painted article.

SUMMARY OF THE INVENTION

One embodiment of the present invention provides a resin composition that can have a metal-like texture near to that (similar to that) of a painted article while not being painted and excellent luminance with almost no flow mark or weld line, and an article using the same.

In one embodiment of the present invention, the resin composition includes a thermoplastic resin and a metal-resin composite particle, wherein the metal-resin composite particle includes a metal deposition layer, a first coating layer positioned on one side of the metal deposition layer, and a second coating layer positioned on the other side of the metal deposition layer, and wherein the first coating layer and second coating layer include a thermosetting resin respectively.

The metal deposition layer may be an aluminum deposition layer.

The metal deposition layer may have a thickness of about 0.01 to about 1.0 µm.

The thermosetting resin may include a phenolic resin, an epoxy resin, an unsaturated polyester resin, an urethane resin, an urea resin, a melamine resin, an alkyd resin, a silicone resin, a vinylester resin, or a combination thereof.

The thermosetting resin may have a refractive index of about 1.45 to about 1.55.

The first coating layer and second coating layer may be transparent or translucent.

The metal-resin composite particle may further include a thermoplastic resin layer, and the thermoplastic resin layer may be positioned on at least one of an external surface of the first coating layer and/or an external surface of the second coating layer.

The metal-resin composite particle may have a thickness of about 1.01 µm to about 100 µm.

The metal-resin composite particle may have an average particle diameter of about 2 µm to about 2000 µm.

The metal-resin composite particle may be included in an amount of about 0.1 to about 2.0 parts by weight based on about 100 parts by weight of the thermoplastic resin.

The thermoplastic resin may include a polycarbonate resin, a rubber modified vinyl-based copolymer resin, a polyester resin, a polyalkyl(meth)acrylate resin, a styrene-based polymer, a polyolefin resin, or a combination thereof.

The thermoplastic resin may have a refractive index of about 1.45 to about 1.55.

The thermoplastic resin may be transparent or translucent.

In another embodiment of the present invention, an article using the resin composition is provided.

The article may have a flop index of about 11 to about 25, a sparkle intensity of about 8 to about 20, and luminance of about 70 to about 100% measured based on a gloss level at an angle of about 60°.

The resin composition and an article using the same can have a metal-like texture near to that (similar to that) of a painted article without being painted and thus can exhibit excellent luminance with almost no flow mark or weld line during injection-molding.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a definition is not otherwise provided, the term "(meth)acrylate" may refer to "acrylate" and "methacrylate". "(Meth)acrylic acid alkyl ester" refers to both "acrylic acid alkyl ester" and "methacrylic acid alkyl ester", and "(meth)acrylic acid ester" refers to both "acrylic acid ester" and "methacrylic acid ester".

When a specific definition is not otherwise provided, the term "copolymerization" may refer to block copolymerization, random copolymerization, graft copolymerization, or alternate copolymerization, and the term "copolymer" may refer to a block copolymer, a random copolymer, a graft copolymer, or an alternate copolymer.

When a specific definition is not otherwise provided, the average particle diameter and thickness of an article are respectively obtained by sampling a part of the article and measuring particle diameters and thicknesses of greater than or equal to about 50 particles and calculating arithmetic means of the particle diameter and thickness measurements of the rest of the particles except for the top 10% and bottom 10% of the particles based on the SEM image through an analysis of the cross section of the article based on a scanning electron microscope (SEM, S4800, Hitachi Inc.).

Figure 1:
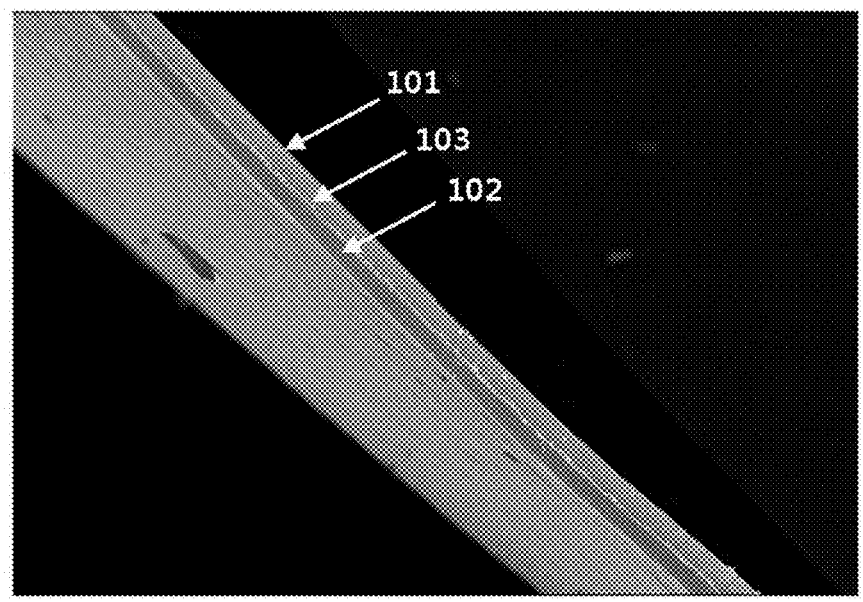
FIG. 1 is a scanning electron microscope (SEM) photograph of a side of a metal-resin composite particle according to one embodiment of the present invention.

Referring to FIG. 1, in one embodiment of the present invention, a resin composition includes a thermoplastic resin, a metal-resin composite particle, wherein the metal-resin composite particle includes a metal deposition layer 103, a first coating layer 101 positioned on one side of the metal deposition layer, and a second coating layer 102 positioned on the other side of the metal deposition layer, and wherein the first coating layer and second coating layer include a thermosetting resin, respectively.

Metal-Resin Composite Particle

The metal-resin composite particle includes a metal deposition layer that can have a high flatness and thus, may exhibit high luminance and/or excellent metal-like texture. Accordingly, when the metal-resin composite particle is used to prepare a resin composition and then, to fabricate a article, the article may exhibit a metal-like texture and/or luminance similar to those of a painted article without being painted.

The metal deposition layer may be an aluminum deposition layer. Accordingly, the article including the aluminum deposition layer may have an excellent metal-like texture, which may be similar to a silver gloss.

The metal deposition layer may have a thickness of about 0.01 to about 1.0 µm, for example about 0.01 to about 0.9 µm, about 0.01 to about 0.8 µm, about 0.01 to about 0.7 µm, about 0.01 to about 0.6 µm, about 0.01 to about 0.5 µm, about 0.05 to about 1.0 µm, about 0.1 to about 1.0 µm, about 0.2 to about 1.0 µm, about 0.3 to about 1.0 µm, or about 0.4 to about 1.0 µm.

In some embodiments, the metal deposition layer may have a thickness of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, or 1.0 µm. Further, according to some embodiments of the present invention, the metal deposition layer may have a thickness from about any of the foregoing amounts to about any other of the foregoing amounts.

The metal deposition layer may be thinner than conventional metal particles prepared by grinding a metal foil and the like.

When the metal deposition layer has a thickness within the above range, a metal-resin composite particle having the metal deposition layer may have very excellent flatness. Accordingly, the resin composition including the metal-resin composite particle and the article using the same can have a metal-like texture similar to that of a painted article without being painted and also can have very excellent luminance and/or almost no flow mark and weld line during injection-molding.

The metal-resin composite particle includes first and second coating layers and may be uniformly dispersed in the resin composition and article using the same.

The first and second coating layers respectively include a thermosetting resin, which may be the same or different, and thus, are not melted nor separated but cause a chemical reaction with the thermoplastic resin when the metal-resin composite particle along with the thermoplastic resin is melted/kneaded at a high process temperature. Accordingly, the metal-resin composite particle is not modified but maintains a shape and property at a high process temperature.

Examples of the thermosetting resin may include without limitation phenolic resins, epoxy resins, unsaturated polyester resins, urethane resins, urea resins, melamine resins, alkyd resins, silicone resins, vinylester resins, and the like and combinations thereof.

At least one of the first coating layer and second coating layer may further include an additive, and the additive may include polyvinyl butyral (PVB).

When at least one of the first and second coating layers further includes the additive, adherence between the metal deposition layer and the first coating layers and/or between the metal deposition layer and the second coating layer and/or transparency of the first coating layer and/or the second coating layer can be improved, and luminance and the like of the metal-resin composite particle can also be improved. Accordingly, the metal-resin composite particle can be very well dispersed in the resin composition and an article using the same, which can provide very excellent luminance.

Each thermosetting resin of the first coating layer and second coating layer may have a refractive index that is the same or different from each other, and independently ranges from about 1.45 to about 1.55.

When the thermosetting resin included in the first and second coating layers has a refractive index within the above range, the resin composition and an article using the same including the metal-resin composite particle can have very excellent metal-like texture and/or luminance.

In particular, when the thermosetting resins respectively included in the first and second coating layers have a similar refractive index to each other, the resin composition and an article using the same may have a metal-like texture similar to that of a painted article without being painted and can have very excellent luminance and/or almost no flow mark and weld line problem during injection-molding.

The first coating layer and second coating layer may each have a thickness that is the same or different from each other, and independently ranges from about 0.5 to about 10 µm, for example, about 0.5 to about 9 µm, about 0.5 to about 8 µm, about 0.5 to about 7 µm, about 0.5 to about 6 µm, about 0.5 to about 5 µm, about 1 to about 10 µm, about 2 to about 10 µm, about 3 to about 10 µm, or about 4 to about 10 µm.

In some embodiments, the first and second coating layers may each independently have a thickness of about 0.5, 0.6, 0.7, 0.8, 0.9, 1, 2, 3, 4, 5, 6, 7, 8, 9, or 10 µm. Further, according to some embodiments of the present invention, the first and second coating layers may each independently have a thickness from about any of the foregoing amounts to about any other of the foregoing amounts.

When the first and second coating layers have a thickness within the above range, the metal-resin composite particle can have very excellent flatness. Accordingly, the resin composition and an article using the same including the metal-resin composite particle can have a metal-like texture that is similar to that of a painted article without being painted and also, can have very excellent luminance and/or almost no flow mark and weld line.

The first coating layer and second coating layer independently may be transparent or translucent. The first coating layer and second coating layer may each have a haze that is the same or different from each other, and independently ranges from about 0.5 to about 40%, for example, about 0.5% to about 40%, about 0.5% to about 35%, about 0.5% to about 30%, about 0.5% to about 25%, about 0.5% to about 20%, or about 0.5% to about 15%.

In some embodiments, the first and second coating layers may each independently have a haze of about 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40%. Further, according to some embodiments of the present invention, the first and second coating layers may each independently have a haze from about any of the foregoing amounts to about any other of the foregoing amounts.

The term transparency of the first and second coating layers indicates that the layers transmit all the incident lights. The term translucence thereof indicates that the layers partially transmit all the incident lights.

The term haze indicates a degree of opaqueness or cloudiness.

The haze is calculated according to the following equation 1 in the present specification.

$$\text{haze}(\%)=\{\text{diffused light}/(\text{diffused and transmitted light}+\text{parallel transmitted light})\}\times 100 \quad [\text{Equation 1}]$$

When the first and second coating layers are transparent or translucent, that is, the first and second coating layers have a haze within the above range, the metal-resin composite particle may provide high luminance and/or excellent metal-like texture. Accordingly, the resin composition and article using the same including the metal-resin composite particle can have a metal-like texture that is similar to that of a painted article without being painted and/or very excellent luminance.

The metal-resin composite particle may have a multi-layer structure.

The metal-resin composite particle may have a sandwich laminated structure.

The metal-resin composite particle may have a multi-layer structure having three or more layers.

The metal-resin composite particle may further include at least one thermoplastic resin layer.

The thermoplastic resin layer may be positioned on at least one or both of the external surfaces of the first and second coating layers.

When the thermoplastic resin layer is further included, the first and/or second coating layer may be more uniformly thick, and the metal deposition layer may have improved flatness. Accordingly, the metal-resin composite particle may have very excellent flatness.

Examples of the thermoplastic resin layer may include without limitation polycarbonate resins, rubber modified vinyl-based copolymer resins, polyester resins, polyalkyl (meth)acrylate resins, styrene-based polymers, polyolefin resins, and the like, and combinations thereof.

The thermoplastic resin layer may include a different material from the first coating layer. The thermoplastic resin layer may also include a different material from the second coating layer.

The metal-resin composite particle may have a thickness of about 1.01 to about 100 µm, for example, about 1.01 to about 90 µm, about 1.01 to about 80 µm, about 1.01 to about 70 µm, about 1.01 to about 60 µm, about 1.01 to about 50 µm, about 2.0 to about 100 µm, about 3.0 to about 100 µm, about 4.0 to about 100 µm, about 5.0 to about 100 µm, about 10 to about 100 µm, about 20 to about 100 µm, about 30 to about 100 µm, or about 40 to about 100 µm.

When the metal-resin composite particle has a thickness within the above range, the metal-resin composite particle may provide high luminance and excellent metal-like texture. Accordingly, the resin composition and article using the same including the metal-resin composite particle may have a metal-like texture similar to that of a painted article without being painted and also, can exhibit very excellent luminance and/or almost no flow mark and weld line problem during injection-molding.

The metal-resin composite particle may have an average particle diameter of about 2 to about 2,000 µm, for example about 2 to about 1,500 µm, about 2 to about 1,000 µm, about 2 to about 900 µm, about 2 to about 800 µm, about 2 to about 700 µm, about 2 to about 600 µm, about 2 to about 500 µm, about 10 to about 1,000 µm, about 20 to about 1,000 µm, about 30 to about 1,000 µm, about 40 to about 1,000 µm, or about 50 to about 1,000 µm.

When the metal-resin composite particle has an average particle diameter within the above range, the metal-resin composite particle may provide high luminance and/or excellent metal-like texture. Accordingly, the resin composition and article using the same including the metal-resin composite particle can have a metal-like texture similar to that of a painted article without being painted and can have very high luminance and/or almost no flow mark and weld line problem during injection-molding.

In addition, when the metal-resin composite particle has an average particle diameter within the above range, the metal-resin composite particle can be uniformly dispersed in the resin composition and article using the same and thus, can improve the metal-like texture of the article and/or luminance and can suppress generation of a flow mark and a weld line.

The thermoplastic resin may include the metal-resin composite particle in an amount of about 0.1 to about 2.0 parts by weight based on 100 parts by weight of the thermoplastic resin, specifically, about 0.1 to about 1.9 parts by weight, about 0.1 to about 1.8 parts by weight, about 0.1 to about 1.7 parts by weight, about 0.1 to about 1.6 parts by weight, about 0.1 to about 1.5 parts by weight, about 0.1 to about 1.4 parts by weight, about 0.1 to about 1.3 parts by weight, about 0.1 to about 1.2 parts by weight, about 0.1 to about 1.1 parts by weight, about 0.1 to about 1.0 parts by weight, about 0.2 to about 2.0 parts by weight, about 0.3 to about 2.0 parts by weight, about 0.4 to about 2.0 parts by weight, about 0.5 to about 2.0 parts by weight, about 0.6 to about 2.0 parts by weight, about 0.7 to about 2.0 parts by weight, about 0.8 to about 2.0 parts by weight, or about 0.9 to about 2.0 parts by weight based on about 100 parts by weight of thermoplastic resin.

In some embodiments, the resin composition may include the metal-resin composite particle in an amount of about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 parts by weight. Further, according to some embodiments of the present invention, the amount of the metal-resin composite particle can be in a range from about any of the foregoing amounts to about any other of the foregoing amounts.

When the thermoplastic resin includes the metal-resin composite particle in an amount within the above range, the resin composition and article using the same including the metal-resin composite particle can have a metal-like texture similar to that of a painted article without being painted and can have very excellent luminance and/or almost no flow mark and weld line problem during injection-molding.

The metal-resin composite particle may be uniformly dispersed in the resin composition and article using the same.

Figure 2:
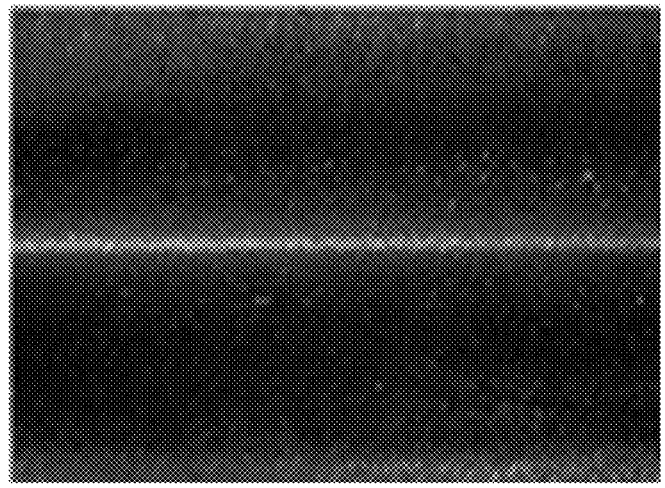
FIG. 2 is a SEM photograph of a cross-section of an article according to Comparative Example 2.

In general, since metal particles have a higher density than a thermoplastic resin, the metal particles can be densely distributed in a center layer with reference to the cross section of a conventional article when an article is fabricated through injection-molding using a resin composition including the metal particles and the thermoplastic resin. Accordingly, the metal particles can be dispersed in the center layer of the article when the metal particles are added to the thermoplastic resin to prepare a conventional resin composition and into the article. The article may not have an excellent metal-like texture and luminance, and can appear different from the appearance of a painted article. In addition, the conventional article may have a flow mark and weld line problem on the surface during the injection-molding. FIG. 2 is a 500-magnified SEM photograph of a cross-section of an article according to one comparative example. As shown in FIG. 2, metal particles of the article of the comparative example are densely distributed in the center layer of the article.

Figure 3:
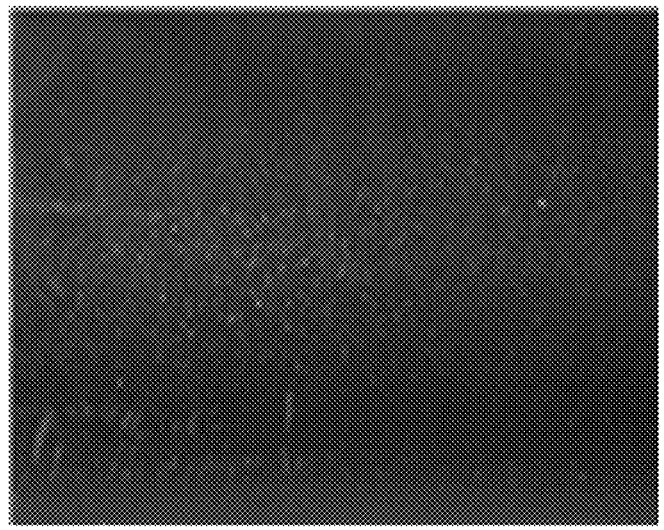
FIG. 3 is a SEM photograph of a cross-section of an article according to one embodiment of the present invention.

In contrast, when a resin composition including a metal-resin composite particle according to one embodiment of the present invention is fabricated into an article, the metal-resin composite particle is not distributed in the center layer of the article with reference of the cross section of the article but uniformly in the article. FIG. 3 is a 500-magnified SEM photograph of a cross-section of an article according to one embodiment of the present invention. As shown in FIG. 3, metal-resin composite particles according to one embodiment are dispersed in the article uniformly.

The metal-resin composite particles may be prepared by depositing a metal on one surface of a first coating layer as a substrate to form a metal deposition layer and then forming a second coating layer on the external surface of the metal deposition layer.

The first and second coating layers may be respectively formed by respectively coating a thermosetting resin composition and curing the thermosetting resin composition by a conventional curing method such as thermal curing or UV curing.

The method of depositing a metal may include a conventional deposition method. Examples of metal deposition methods may include without limitation sputtering, E-beam evaporation, thermal evaporation, laser molecular beam epitaxy (L-MBE), pulsed laser deposition (PLD), metal-organic chemical vapor deposition (MOCVD), hydride vapor phase epitaxy (HVPE), and the like.

Another method of forming the metal-resin composite particle may include forming a first coating layer on one side of a thermoplastic resin layer, depositing a metal to form a metal deposition layer, and forming a second coating layer on the external surface of the metal deposition layer. In addition, another first coating layer may be formed on the other side of the thermoplastic resin layer having the first coating layer, the metal deposition layer, and the second coating layer, and then after another metal deposition layer is formed thereon, another second coating layer can be formed on the external surface of the metal deposition layer.

The metal-resin composite particle may be prepared singularly or in a mixture of the manufacturing methods. The method may be more than one time repetitively applied to form multi-layered metal-resin composite particles.

Thermoplastic Resin

The thermoplastic resin may be a polycarbonate resin, a rubber modified vinyl-based copolymer resin, a polyester resin, a polyalkyl(meth)acrylate resin, a styrene-based polymer, a polyolefin resin, or a combination thereof.

The thermoplastic resin may have a refractive index of about 1.45 to about 1.55.

When the thermoplastic resin has a refractive index within the above range, an article using the resin composition including the same may have excellent metal-like texture and/or luminance.

In particular, when both of the thermosetting resins included in the first and second coating layers have a similar refractive index, the resin composition and article using the same may have a metal-like texture that is similar to that of a painted article without being painted and/or also can have excellent luminance and/or almost no flow mark and weld line problem during the injection-molding.

The thermoplastic resin may be transparent or translucent. The thermoplastic resin may have a haze of about 0.5 to about 40%, for example about 0.5% to about 40%, about 0.5% to about 35%, about 0.5% to about 30%, about 0.5% to about 25%, about 0.5% to about 20%, about 0.5% to about 15%.

In some embodiments, the thermoplastic resin may have a haze of about 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40%. Further, according to some embodiments of the present invention, the thermoplastic resin may have a haze from about any of the foregoing amounts to about any other of the foregoing amounts.

The term transparency indicates that all the incident lights are almost transmitted, and the term translucence indicates that all the lights are partially transmitted.

When the thermoplastic resin has a haze within the above range, an article using the resin composition including the metal-resin composite particle may have a metal-like texture that is similar to that of a painted article without being painted and/or also can have very excellent luminance.

The thermoplastic resin may be any well-known transparent or translucent resin. For example, as described herein, the thermoplastic resin may be a polycarbonate resin, a rubber modified vinyl-based copolymer resin, a polyester resin, a polyalkyl(meth)acrylate resin, a styrene-based polymer, a polyolefin resin, or a combination thereof.

The thermoplastic resin may provide basic properties such as impact resistance, heat resistance, flexural characteristics, tensile characteristics, and the like.

The polycarbonate resin may be prepared by reacting one or more diphenols with a compound of a phosgene, halogen formate, carbonate ester, or a combination thereof.

Examples of the diphenols include without limitation hydroquinone, resorcinol, 4,4'-dihydroxydiphenyl, 2,2-bis(4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like, and combinations thereof. Of the diphenols, 2,2-bis(4-hydroxyphenyl)propane, 2,2-bis(3,5-dichloro-4-hydroxyphenyl)propane and/or 1,1-bis(4-hydroxyphenyl)cyclohexane may be used, for example 2,2-bis(4-hydroxyphenyl)propane may be used.

The polycarbonate resin may have a weight average molecular weight of about 10,000 to about 200,000 g/mol, for example about 15,000 to about 80,000 g/mol, without limitation.

The polycarbonate resin may be a mixture of copolymers obtained using two or more dipenols that differ from each other. The polycarbonate resin may include a linear polycarbonate resin, a branched polycarbonate resin, a polyestercarbonate copolymer resin, and the like, or a combination thereof.

The linear polycarbonate resin may include a bisphenol-A-based polycarbonate resin. The branched polycarbonate resin may be produced by reacting a multi-functional aromatic compound such as trimellitic anhydride, trimellitic acid, and the like with diphenols and a carbonate. The multi-functional aromatic compound may be included in an amount of about 0.05 to about 2 mol % based on the total weight of the branched polycarbonate resin. The polyester carbonate copolymer resin may be produced by reacting difunctional carboxylic acid with one or more diphenols and a carbonate. The carbonate may include a diaryl carbonate such as diphenyl carbonate, ethylene carbonate, and the like.

The rubber modified vinyl-based copolymer resin may include about 5 to about 95 wt % of a vinyl-based polymer and about 5 to about 95 wt % of a rubbery polymer.

The rubbery polymer may include a butadiene rubber, an acrylic rubber, an ethylene/propylene rubber, a styrene/butadiene rubber, an acrylonitrile/butadiene rubber, an isoprene rubber, an ethylene-propylene-diene terpolymer (EPDM) rubber, a polyorganosiloxane/polyalkyl(meth)acrylate rubber composite, or a combination thereof.

The vinyl-based polymer may be a polymer of about 50 to about 95 wt % of a first vinyl-based monomer including an aromatic vinyl monomer, an acrylic-based monomer, a heterocyclic monomer, or a combination thereof; and about 5 to about 50 wt % of a second vinyl-based monomer including an unsaturated nitrile monomer, an acrylic-based monomer, a heterocyclic monomer, or a combination thereof.

Examples of the aromatic vinyl monomer may include without limitation styrene, C1 to C10 alkyl-substituted styrene, halogen-substituted styrene, and the like, and combinations thereof. Examples of the alkyl-substituted styrene may include o-ethyl styrene, m-ethyl styrene, p-ethyl styrene, α-methyl styrene, and the like, and combinations thereof.

Examples of the acrylic-based monomer may include without limitation (meth)acrylic acid alkyl esters, (meth)acrylic acid esters, and the like, and combinations thereof. As used herein, the alkyl may be a C1 to C10 alkyl. Examples of the (meth)acrylic acid alkyl ester may include without limitation methyl(meth)acrylate, ethyl(meth)acrylate, propyl(meth)acrylate, butyl(meth)acrylate, and the like, and combinations thereof, for example, methyl(meth)acrylate. Examples of the (meth)acrylic acid ester may include without limitation (meth)acrylate, and the like.

Examples of the heterocyclic monomer may include without limitation maleic anhydride, C1 to C10 alkyl- and/or phenyl N-substituted maleimides, and the like, and combinations thereof.

Examples of the unsaturated nitrile monomer may include without limitation acrylonitrile, methacrylonitrile, ethacrylonitrile, and the like, and combinations thereof.

When the rubber modified vinyl-based graft copolymer resin is prepared, a rubber particle may have a particle diameter of about 0.1 to about 1 μm to improve the impact resistance and surface characteristics of an article, and when the particle diameter of the rubber particle ranges from about 0.1 to about 1 μm, excellent impact strength may be secured.

The rubber modified vinyl-based copolymer resin may be used singularly or as a mixture of two or more.

Specific examples of the rubber modified vinyl-based copolymer resin may include a styrene, acrylonitrile, and optionally methyl(meth)acrylate graft-copolymerized on a butadiene rubber, an acrylic rubber, or a styrene/butadiene rubber as a mixture.

Another example of the rubber modified vinyl-based copolymer resin may be a copolymer including methyl(meth)acrylate graft-copolymerized on a butadiene rubber, an acrylic rubber, or a styrene/butadiene rubber.

The method of preparing the rubber modified vinyl-based graft copolymer resin is widely known to those skilled in the art, and may be any one of emulsion polymerization, suspension polymerization, solution polymerization or massive polymerization.

The polyester resin is an aromatic polyester resin, and it may be a condensation-polymerized resin obtained from melt polymerization of terephthalic acid or alkylester terephthalate, and a C2 to C10 glycol component. As used herein, the alkyl may be a C1 to C10 alkyl.

Examples of the aromatic polyester resin may include without limitation a polyethylene terephthalate resin, a polytrimethylene terephthalate resin, a polybutylene terephthalate resin, a polyhexamethylene terephthalate resin, a polycyclohexane dimethylene terephthalate resin, a polyester resin modified into a non-crystalline resin by mixing the resins with another monomer, and the like, and combinations thereof. In exemplary embodiments a polyethylene terephthalate resin, a polytrimethylene terephthalate resin, a polybutylene terephthalate resin, and/or a non-crystalline polyethylene terephthalate resin may be used, for example a polybutylene terephthalate resin and/or a polyethylene terephthalate resin may be used.

The polyethylene terephthalate resin may be a condensation-polymerized polymer obtained through a direct ester reaction or an ester exchange reaction of an ethyleneglycol monomer and a terephthalic acid or dimethyl terephthalate monomer.

Also, to increase the impact strength of the polyethylene terephthalate resin, the polyethylene terephthalate resin may be copolymerized with polytetramethyleneglycol (PTMG), polyethyleneglycol (PEG), polypropyleneglycol (PPG), a low molecular-weight aliphatic polyester, or aliphatic polyamide, or it may be used in the form of a modified polyethylene terephthalate resin obtained by blending with a component improving an impact strength.

The polyalkyl(meth)acrylate resin may be obtained by polymerizing a monomer material including an alkyl(meth)acrylate through a known polymerization method, such as a suspension polymerization method, a massive polymerization method, an emulsion method and the like.

The alkyl(meth)acrylate may have a C1 to C10 alkyl group, and may include methyl(meth)acrylate, ethyl(meth)acrylate, butyl(meth)acrylate, glycidyl(meth)acrylate, hydroxyethyl(meth)acrylate, and the like, and combinations thereof.

The polyalkyl(meth)acrylate may have a weight average molecular weight of about 10,000 to about 200,000 g/mol, for example about 15,000 to about 150,000 g/mol. When the polyalkyl(meth)acrylate has a weight average molecular weight within the above range, hydrolysis resistance, scratch resistance, workability, and the like may be improved.

The styrene-based polymer may be a polymer including about 20 to about 100 wt % of a styrene-based monomer; and about 0 to about 80 wt % of a vinyl-based monomer including an acrylic-based monomer, a heterocyclic monomer, an unsaturated nitrile monomer, or a combination thereof. The styrene-based polymer may be for example a rubber modified styrene-based polymer such as a rubber-reinforced polystyrene resin (HIPS).

Examples of the styrene-based monomer may include without limitation styrene, C1 to C10 alkyl-substituted styrene, halogen-substituted styrene, and the like, and combinations thereof. Examples of the alkyl-substituted styrene may include without limitation o-ethyl styrene, m-ethyl styrene, p-ethyl styrene, α-methyl styrene, and the like, and combinations thereof.

Examples of the acrylic-based monomer may include without limitation (meth)acrylic acid alkyl esters, (meth)acrylic acid esters, and the like, and combinations thereof. As used herein, the alkyl may be a C1 to C10 alkyl. Examples of the (meth)acrylic acid alkyl ester may include without limitation methyl(meth)acrylate, ethyl(meth)acrylate, propyl(meth)acrylate, butyl(meth)acrylate, and the like, and combinations thereof, for example, methyl(meth)acrylate. Examples of the (meth)acrylic acid ester may include without limitation (meth)acrylate, and the like.

Examples of the heterocyclic monomer may include without limitation maleic anhydride, C1 to C10 alkyl- and/or phenyl N-substituted maleimides, and the like and combinations thereof.

Examples of the unsaturated nitrile monomer may include without limitation acrylonitrile, methacrylonitrile, ethacrylonitrile, and the like and combinations thereof.

Examples of the styrene-based polymer may include without limitation a copolymer of a styrene-based monomer and an unsaturated nitrile monomer, a copolymer of a styrene-based monomer and an acrylic-based monomer, a copolymer of a styrene-based monomer, an unsaturated nitrile monomer, and an acrylic-based monomer, a styrene-based homopolymer of a styrene-based monomer, and the like, and combinations thereof.

The styrene-based polymer may have a weight average molecular weight of about 40,000 to about 500,000 g/mol.

The styrene-based polymer may be prepared using emulsion polymerization, suspension polymerization, solution polymerization, massive polymerization, and the like.

Examples of the polyolefin resin may include without limitation polyethylene resins (PE), polypropylene resins (PP), copolymers thereof, and the like and combinations thereof.

The thermoplastic resin may be an alloy including two or more kinds of resins.

Other Additive(s)

The resin composition may further include one or more additives. Examples of the additives may include without limitation antibacterial agents, heat stabilizers, antioxidants, release agents, light stabilizers, surfactants, coupling agents, plasticizers, admixtures, colorants, stabilizers, lubricants, anti-static agents, coloring aids, flame proofing agents, weather-resistance agents, ultraviolet (UV) absorbers, ultraviolet (UV) blocking agents, nucleating agents, adhesion aids, adhesives, and the like and combinations thereof.

Examples of the antioxidant may include without limitation phenol antioxidants, phosphite antioxidants, thioether antioxidants, amine antioxidants, and the like, and combinations thereof.

Examples of the release agent may include without limitation fluorine-included polymers, silicon oils, stearic metal salts, montanic metal salts, montanic ester waxes, polyethylene waxes, and the like, and combinations thereof.

Examples of the weather-resistance agent may include without limitation benzophenone-type weather-resistance agents, amine-type weather-resistance agents, and the like, and combinations thereof.

Examples of the colorant may include without limitation dyes, pigments, and the like, and combinations thereof.

Examples of the ultraviolet (UV) ray blocking agent may include without limitation titanium oxide ($TiO_2$), carbon black, and the like and combinations thereof.

Examples of the nucleating agent may include without limitation talc, clay, and the like, and combinations thereof.

The additive may be included in a predetermined amount as long as it does not deteriorate the properties of the resin composition. The additive(s) may be included in an amount of less than or equal to about 40 parts by weight, for example about 0.1 to about 30 parts by weight based on about 100 parts by weight of the thermoplastic resin.

The resin composition may be prepared by any well-known method of preparing a resin composition. For example, each component according to one embodiment of the present invention can be simultaneously mixed with other additives. The mixture can be melt-extruded and prepared into a pellet.

According to another embodiment of the present invention, an article fabricated using the resin composition is provided.

The article may be manufactured by various processes such as injection-molding, blow molding, extrusion molding, thermal molding, and the like, using the resin composition. In particular, the article can have almost no flow mark and weld line problem and can have a metal-like texture appearance and thus, may be used in the manufacture of exterior plastic products such as but not limited to IT products, home appliances, interior/exterior auto parts, furniture, interior items, miscellaneous goods, and the like.

Accordingly, the article according to one embodiment of the present invention can have an excellent metal-like texture. In the present invention, the metal-like texture is evaluated using a flop index.

The flop index may be calculated according to the following Equation 1.

$$\text{Flop Index} = \frac{2.69(L^*_{15°} \cdot L^*_{110°})^{1.11}}{(L^*_{45°})^{0.86}} \quad [\text{Equation 1}]$$

In Equation 1, L*(x°) indicates luminance measured at x°.

The flop index is obtained by measuring reflectivity change while an angle of reflection is revolved and specifically by measuring luminance (L*) at each angle of reflection of about 15°, 45° and 110° and then calculating the measurements according to the Equation 1. In one embodiment of the present invention, the flop index is measured using a BYK Mac spectrophotometer (BYK Inc.).

For example, one surface having no metal-like texture has a flop index of 0, a metal has a flop index ranging from about 15 to about 17, a metal-like texture coating used for an automobile body paint has a flop index of about 11; and the metal-like texture sensed by the naked eye has a flop index of greater than or equal to about 6.5.

According to one embodiment of the present invention, an article may have a flop index ranging from about 11 to about 25. For example, the flop index may be in a range of about 11 to about 20 and as another example, about 11 to about 15.

Accordingly, the article according to one embodiment can have excellent metal particle texture. The metal particle texture uses a sparkle intensity as an index. The sparkle intensity may be obtained according to the following Equation 2.

$$\Delta S_{total} = \sqrt{\frac{\Delta S^2_{15°} + \Delta S^2_{45°} + \Delta S^2_{75°} + \Delta G^2}{4}} \quad [\text{Equation 2}]$$

Figure 4:
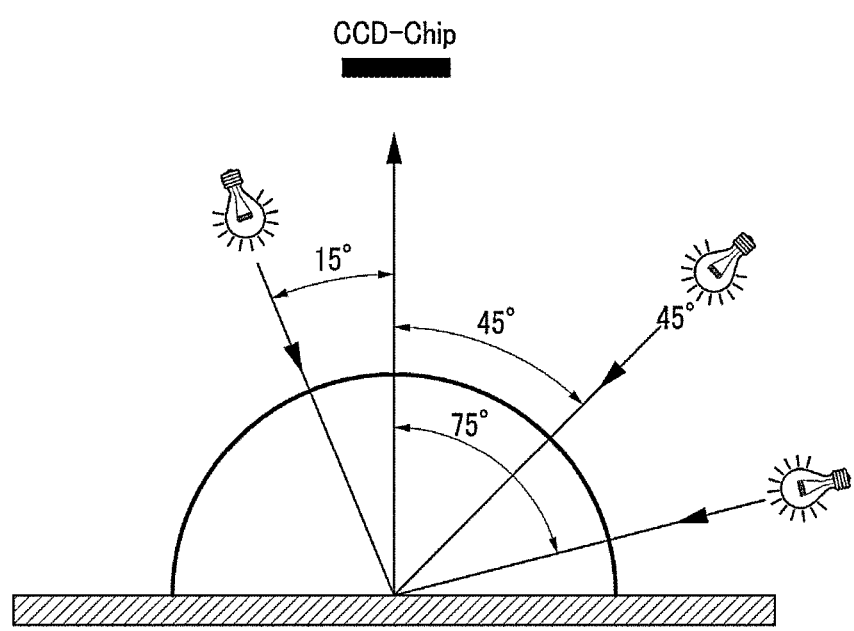
FIG. 4 is a schematic view showing a method of measuring a metal particle texture of the present invention.

In Equation 2, $\Delta S(x°)$ indicates sparkle intensity measured at $x°$, and $\Delta G$ is diffusion of each $\Delta S(x°)$ and indicates graininess of metal particles. The sparkle intensity ($\Delta S_{total}$) of the article is calculated according to the Equation 2 after measuring each sparkle intensity at about 15°, 45°, and 75°. The method of measuring the sparkle intensity is schematically provided in FIG. 4. In the present invention, the sparkle intensity is measured using a MA98 multi-angle spectrophotometer (X-Rite Inc.).

The sparkle intensity calculated according to Equation 2 is obtained by combining the following factors.

[Four Factors]
① Reflectivity of individual metal particle
② Amounts of metal particle
③ Sizes of metal particle
④ Orientation of metal particle The article according to one embodiment of the present invention may have a sparkle intensity of about 8 to about 20, for example, about 8 to about 15, or about 8 to about 10.

The article according to one embodiment of the present invention may have improved luminance. In the present invention, the luminance as an index showing brightness such as metal gloss is measured using a gloss level at about 60° with an UGV-6P digital variable glossmeter (SUGA Inc.).

The article according to one embodiment of the present invention may have a luminance of about 70 to about 100%, for example about 70 to about 95%, about 75 to about 100%, about 75 to about 95%, about 80 to about 100%, about 80 to about 95%, about 85 to about 100%, or about 85 to about 95%.

Accordingly, the article according to one embodiment of the present invention may have a metal-like texture and/or luminance that is similar to that of a painted article without being painted. In addition, the article may have almost no flow mark and weld line problem.

Hereinafter, the present invention is illustrated in more detail with reference to examples. However, they are exemplary embodiments of the present invention, and the present invention is not limited thereto.

EXAMPLES

Resin compositions are prepared according to the following Table 1.

TABLE 1

| Components | unit | Examples | | | | | | | | Comparative Examples | | |
|---|---|---|---|---|---|---|---|---|---|---|---|---|
| | | 1 | 2 | 3 | 4 | 5 | 6 | 7 | 8 | 1 | 2 | 3 |
| Polyalkyl(meth)acrylate resin (A) | wt % | 100 | 100 | 100 | 100 | 100 | 100 | — | — | 100 | 100 | 100 |
| Rubber modified vinyl-based copolymer resin (B) | wt % | — | — | — | — | — | — | 100 | 100 | — | — | — |
| Metal-resin composite particle (C) | parts by weight | 0.1 | 0.2 | 0.3 | 0.5 | 1.0 | 2.0 | 0.3 | 1.0 | — | — | — |
| Metal particle-1 (D) | parts by weight | — | — | — | — | — | — | — | — | 0.7 | — | — |
| Metal particle-2 (E) | parts by weight | — | — | — | — | — | — | — | — | — | 0.5 | — |

(Note):
an article is painted with aluminum in Comparative Example 3.
Each component used in Table 1 is illustrated as follows.
(A) Polyalkyl(meth)acrylate resin: a transparent polymethylmethacrylate resin (Cheil Industries Inc., Korea) having a refractive index of 1.48, and a haze of 3.2 mm-thick specimen of 0.7%.
(B) Rubber modified vinyl-based copolymer resin: a transparent acrylonitrile-butadiene-styrene-methylmethacrylate copolymer resin (Cheil Industries Inc., Korea) having a refractive index of 1.52, and a haze of 3.2 mm-thick specimen of 1.7%.
(C) Metal-resin composite particle: a metal-resin composite particle including an aluminum vacuum deposition layer, a first coating layer on one side of the aluminum vacuum deposition layer, and a second coating layer on the other side of the aluminum vacuum deposition layer. The first and second coating layers include 70 wt % of a silicone resin and 30 wt % of polyvinyl butyral (PVB) and have a refractive index of 1.47. The metal-resin composite particle has an average particle diameter of about 100 μm and an average thickness of about 1.4 μm.
(D) Metal particle-1: An amorphous sheet-shaped aluminum particle having an average particle diameter of about 100 μm and a thickness of about 20 μm (Nihonboitz, Japan).
(E) Metal particle-2: An amorphous sheet-shaped aluminum particle having an average particle diameter of about 8 μm and a thickness of about 0.1 μm (Silberline Manufacturing Co., Ltd. USA).

Examples 1 to 8 and Comparative Examples 1 to 3

The aforementioned components are used in the amounts in Table 1 to prepare resin compositions according to Examples 1 to 8 and Comparative Examples 1 to 3. The resin compositions are extruded through a conventional twin-screw extruder at a temperature ranging from 180 to 240° C. and then, fabricated into a pellet.

The pellets are dried at 80° C. for 4 hours and then, injection-molded using an injection molder having injection capability of 6 Oz. Herein, the cylinder was set at a temperature of 220 to 250° C., a molding temperature of 100° C., and a molding cycle time of 30 seconds. Article specimens (width X length×thickness=100 mm×150 mm×3 mm) are manufactured by injection-molding to have a weld line on the surface using a mold having two gates. On the other hand, an article specimen is painted with aluminum according to Comparative Example 3.

Experimental Examples

The article specimens are evaluated according to the following methods. The results are provided in the following Table 2.

TABLE 2

|  |  | Examples | | | | | | | | Comparative Examples | | |
|---|---|---|---|---|---|---|---|---|---|---|---|---|
|  |  | 1 | 2 | 3 | 4 | 5 | 6 | 7 | 8 | 1 | 2 | 3 |
| Metal-like texture (Flop index) | | 12 | 13 | 14 | 15 | 15 | 15 | 12 | 13 | 5 | 10 | 15 |
| Metal particle texture (Sparkle intensity) | | 8 | 9 | 10 | 10 | 10 | 10 | 8 | 10 | 8 | 5 | 10 |
| Luminance (%) (Gloss level, 60°) | | 80 | 82 | 87 | 90 | 92 | 95 | 80 | 85 | 65 | 77 | 90 |
| Article appearance | Flow mark | 4 | 4 | 3 | 3 | 3 | 3 | 3 | 3 | 3 | 1 | 4 |
|  | Weld line | 4 | 3 | 3 | 3 | 3 | 3 | 3 | 3 | 3 | 1 | 4 |

Experimental Example 1

Dispersion Degree of Metal-Resin Composite Particle in Article

FIG. 2 is a 500-magnified SEM photograph of a cross-section of the article according to Comparative Example 2. As can be seen in FIG. 2, the metal particles are densely distributed in a center layer of an article.

FIG. 3 is a 500-magnified SEM photograph of a cross-section of the article according to Example 4. As can be seen in FIG. 3, the metal-resin composite particles are uniformly dispersed in the article according to one embodiment.

Experimental Example 2

Metal-Like Texture (Flop Index)

The article according to the present invention is measured regarding the metal-like texture using a flop index.

The flop index of the article is measured using a BYK-Mac spectrophotometer (BYK Inc.).

Referring to Table 2, an aluminum painting article according to Comparative Example 3 has a flop index of 15. The articles according to Examples 1 to 8 are not painted but have a flop index ranging from 12 to 15 and exhibit a metal-like texture near to that of a painted article. In particular, the articles according to Examples 4 to 6 have a flop index of 15 and exhibit an equivalent metal-like texture to that of a painted article.

In contrast, the articles according to Comparative Examples 1 and 2 including conventional metal particles instead of metal-resin composite particles have a remarkably low flop index.

Experimental Example 3

Metal Particle Texture (Sparkle Intensity)

The metal particle texture is evaluated by using sparkle intensity as an index in the present invention.

The sparkle intensity of the article according to the present invention is measured using a multi-angle spectrophotometer (MA98, X-Rite Inc.).

Referring to Table 2, the aluminum-painted article according to Comparative Example 3 has a sparkle intensity of 10. The articles according to Examples 1 to 8 are not painted but have a sparkle intensity ranging from 8 to 10 and exhibit a metal particle texture near to that of the painted article. In particular, the articles of Examples 3 to 6 and 8 have a sparkle intensity of 10 and exhibit an equivalent metal particle texture to that of the painted article.

In contrast, the article according to Comparative Example 2 has a lower sparkle intensity than those according to Examples 1 to 8.

Experimental Example 4

Luminance

The article according to the present invention is evaluated regarding luminance as a brightness index such as metal gloss and the like by measuring a gloss level at 60° with a UGV-6P digital variable glossmeter (SUGA Test Instruments Co., Ltd.).

Referring to Table 2, an aluminum-painted article according to Comparative Example 6 has a luminance of 90%. The articles according to Examples 1 to 8 are not painted but have a luminance ranging from 80 to 95% near to that of the painted article or more excellent luminance. In particular, the articles according to Examples 4 to 6 have a luminance of greater than or equal to 90% near to that of the painted article or more excellent luminance.

In contrast, the articles according to Comparative Examples 1 and 2 have a remarkably lower luminance than those according to Examples 1 to 8.

Experimental Example 5

Article Appearance

The articles according to Example and Comparative Example are observed regarding appearance, that is, flow mark and weld line degrees due to injection-molding with the naked eye. The appearance of the articles is evaluated with a reference to the following Table 3.

TABLE 3

| Index of article appearance | Article appearance |
|---|---|
| 1 | A different color of greater than or equal to 70% to less than or equal to 100% in the flow mark or weld line |

TABLE 3-continued

| Index of article appearance | Article appearance |
|---|---|
| 2 | A different color of greater than or equal to 50% to less than or equal to 70% in the flow mark or weld line flow mark |
| 3 | A different color of greater than or equal to 10% to less than or equal to 50% in the flow mark or weld line flow mark |
| 4 | A different color of less than or equal to 10% in the flow mark or weld line flow mark |

Referring to Table 3, the articles according to Examples 1 to 8 have a very excellent article appearance of 3 to 4. In other words, the article according to Example 1 has almost no different color in the flow mark or weld line. The article according to Example 2 does not show a flow mark. The article according to the present invention has no different color in a flow mark or weld line and excellent appearance near to the aluminum-painted article according to Comparative Example 3.

In contrast, the article according to Comparative Example 2 has a different color of 70% and less than 100% in a flow mark and a weld line.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

DESCRIPTION OF SYMBOLS

101: first coating layer
102: second coating layer
103: metal deposition layer

What is claimed is:

1. A resin composition, comprising:
   a thermoplastic resin and a metal-resin composite particle,
   wherein the metal-resin composite particle has a laminated structure wherein a metal deposition layer is positioned between a first coating layer contacting one surface of the metal deposition layer, and a second coating layer contacting the other surface of the metal deposition layer,
   the first coating layer and second coating layer comprise a thermosetting resin respectively, and
   at least one of the first coating layer and second coating layer further comprises polyvinyl butyral (PVB).

2. The resin composition of claim 1, wherein the metal deposition layer is an aluminum deposition layer.

3. The resin composition of claim 1, wherein the metal deposition layer has a thickness of about 0.01 μm to about 1.0 μm.

4. The resin composition of claim 1, wherein the thermosetting resin comprises a phenolic resin, an epoxy resin, an unsaturated polyester resin, an urethane resin, an urea resin, a melamine resin, an alkyd resin, a silicone resin, a vinylester resin, or a combination thereof.

5. The resin composition of claim 1, wherein the thermosetting resin has a refractive index of about 1.45 to about 1.55.

6. The resin composition of claim 1, wherein the first coating layer and second coating layer are independently transparent or translucent.

7. The resin composition of claim 1, wherein the metal-resin composite particle further comprises a thermoplastic resin layer,
   wherein the thermoplastic resin layer is positioned on at least one of an external surface of the first coating layer and an external surface of the second coating layer.

8. The resin composition of claim 1, wherein the metal-resin composite particle has a thickness of about 1.01 μm to about 100 μm.

9. The resin composition of claim 1, wherein the metal-resin composite particle has an average particle diameter of about 2 μm to about 2000 μm.

10. The resin composition of claim 1, wherein the metal-resin composite particle is included in an amount of about 0.1 to about 2.0 parts by weight based on about 100 parts by weight of the thermoplastic resin.

11. The resin composition of claim 1, wherein the thermoplastic resin comprises a polycarbonate resin, a rubber modified vinyl-based copolymer resin, a polyester resin, a polyalkyl(meth)acrylate resin, a styrene-based polymer, a polyolefin resin, or a combination thereof.

12. The resin composition of claim 1, wherein the thermoplastic resin has a refractive index of about 1.45 to about 1.55.

13. The resin composition of claim 1, wherein the thermoplastic resin is transparent or translucent.

14. An article using the resin composition of claim 1.

15. The article of claim 14, wherein the article has a flop index of about 11 to about 25,
   a sparkle intensity of about 8 to about 20, and
   luminance of about 70 to about 100% measured based on a gloss level at an angle of about 60°.

* * * * *